(12) United States Patent
Keracik et al.

(10) Patent No.: US 9,080,434 B2
(45) Date of Patent: Jul. 14, 2015

(54) ACCESS SYSTEM FOR A PRESSURE CONTROLLED ENVIRONMENT

(71) Applicant: Red Leaf Resources, Inc, South Jordan, UT (US)

(72) Inventors: Charles Keracik, South Jordan, UT (US); James W. Patten, South Jordan, UT (US)

(73) Assignee: Red Leaf Resources, Inc., South Jordan, UT (US)

( * ) Notice: Subject to any disclaimer, the term of this patent is extended or adjusted under 35 U.S.C. 154(b) by 241 days.

(21) Appl. No.: 13/916,465

(22) Filed: Jun. 12, 2013

(65) Prior Publication Data

US 2013/0333763 A1  Dec. 19, 2013

Related U.S. Application Data

(60) Provisional application No. 61/659,249, filed on Jun. 13, 2012.

(51) Int. Cl.
*E21B 43/12* (2006.01)
*C10G 1/02* (2006.01)
*G05D 27/00* (2006.01)

(52) U.S. Cl.
CPC . *E21B 43/12* (2013.01); *C10G 1/02* (2013.01); *G05D 27/00* (2013.01); *C10G 2300/4012* (2013.01); *C10G 2300/4037* (2013.01)

(58) Field of Classification Search
CPC .............. F04F 1/00; H01F 27/10; B09B 5/00
USPC ........... 137/154; 405/129.45, 129.95, 129.97, 405/128.8, 128.85, 128.6, 128.28, 129.28; 208/390, 400
See application file for complete search history.

(56) References Cited

U.S. PATENT DOCUMENTS 1,671,492 A * 5/1928 Skinner ......................... 174/11 R
3,055,972 A * 9/1962 Peterson ........................ 174/151

(Continued)

FOREIGN PATENT DOCUMENTS

JP        11181873        7/1999
WO    WO 2005/045173    5/2005

OTHER PUBLICATIONS

PCT/US2013/045486; filed Jun. 12, 2013; Red Leaf Resources, Inc.; international search report dated Sep. 27, 2013.

Primary Examiner — Craig Schneider
Assistant Examiner — Daniel Donegan
(74) Attorney, Agent, or Firm — Thorpe North & Western, LLP

(57) ABSTRACT

An access system for a pressure controlled environment is disclosed and described. The system can include a pressurized region having a first fluid. The pressurized region can be defined, at least partially, by a barrier separating the pressurized region from a lower pressure region. The system can also include a trap fluidly coupling the pressurized region and the lower pressure region through at least a portion of the barrier. The trap can have a second fluid forming a seal to prevent the first fluid from escaping the pressurized region. Additionally, the system can include at least one cable extending through the trap and the barrier into the pressurized region.

24 Claims, 4 Drawing Sheets

(56) References Cited

U.S. PATENT DOCUMENTS

| | | | |
|---|---|---|---|
| 3,339,011 A * | 8/1967 | Ewers, Jr. et al. | 174/92 |
| 3,892,519 A | 7/1975 | Reed et al. | |
| 3,961,641 A | 6/1976 | Tyson | |
| 4,087,592 A | 5/1978 | Okazaki et al. | |
| 4,679,681 A | 7/1987 | Creydt et al. | |
| 4,796,658 A * | 1/1989 | Caple | 137/312 |
| 5,121,602 A | 6/1992 | McCorvey | |
| 5,419,359 A | 5/1995 | Kor | |
| 5,816,745 A * | 10/1998 | Tenbusch, II | 405/184 |
| 6,354,596 B1 * | 3/2002 | Rodriguez | 277/317 |
| 6,439,580 B1 * | 8/2002 | Hecht et al. | 277/605 |
| 6,719,004 B2 | 4/2004 | Huber et al. | |
| 7,686,034 B1 | 3/2010 | Coogle | |
| 7,862,705 B2 | 1/2011 | Dana et al. | |
| 8,875,371 B2 * | 11/2014 | Patten et al. | 29/434 |
| 2005/0178438 A1 * | 8/2005 | Renner | 137/247.41 |
| 2007/0189856 A1 * | 8/2007 | Schwalbe | 405/129.95 |
| 2008/0190818 A1 | 8/2008 | Dana et al. | |
| 2008/0230219 A1 | 9/2008 | Kaminsky | |
| 2010/0218945 A1 | 9/2010 | Sadok | |
| 2010/0310317 A1 | 12/2010 | Eftekharzadeh | |
| 2012/0273060 A1 * | 11/2012 | Makaitan et al. | 137/142 |

* cited by examiner

ACCESS SYSTEM FOR A PRESSURE CONTROLLED ENVIRONMENT

RELATED APPLICATIONS

This application claims the benefit of U.S. Provisional Application No. 61/659,249, filed Jun. 13, 2012, which is incorporated herein by reference.

FIELD OF THE INVENTION

The present invention relates generally to instrumentation access to pressure controlled environments in which pyrolysis is occurring. Accordingly, the invention involves the fields of mechanical and chemical engineering.

BACKGROUND

Global and domestic demand for fossil fuels continues to rise despite price increases and other economic and geopolitical concerns. As such demand continues to rise, research and investigation into finding additional economically viable sources of fossil fuels correspondingly increases. Historically, many have recognized the vast quantities of energy stored in oil shale, coal and tar sand deposits, for example. However, these sources remain a difficult challenge in terms of economically competitive recovery. Canadian tar sands have shown that such efforts can be fruitful, although many challenges still remain, including environmental impact, product quality, and production costs and process time, among others.

Estimates of world-wide oil shale reserves range from two to almost seven trillion barrels of oil, depending on the estimating source. Regardless, these reserves represent a tremendous volume and remain a substantially untapped resource. A large number of companies and investigators continue to study and test methods of recovering oil from such reserves. In the oil shale industry, methods of extraction have included underground rubble chimneys created by explosions, in-situ methods such as In-Situ Conversion Process (ICP) method (Shell Oil), and heating within steel fabricated retorts. Other methods have included in-situ radio frequency heating (microwaves), and "modified" in-situ processes wherein underground mining, blasting and retorting have been combined to make rubble out of a formation to allow for better heat transfer and product removal.

Among typical oil shale processes, all face tradeoffs in economics and environmental concerns. No current process alone satisfies economic, environmental and technical challenges. Moreover, global warming concerns give rise to additional measures to address carbon dioxide ($CO_2$) emissions that are associated with such processes. Methods are needed that accomplish environmental stewardship, yet still provide high-volume cost-effective oil production.

Below ground in-situ concepts emerged based on their ability to produce high volumes while avoiding the cost of mining. While the cost savings resulting from avoiding mining can be achieved, the in-situ method requires heating a formation for a long period of time due to the extremely low thermal conductivity and high specific heat of solid oil shale. Perhaps the most significant challenge for any in-situ process is the uncertainty and long-term potential of water contamination that can occur with underground freshwater aquifers. In the case of Shell's ICP method, a "freeze wall" is used as a barrier to keep separation between aquifers and an underground treatment area. Long-term prevention of contamination has yet to be conclusively demonstrated and there are few remedies should a freeze wall fail, so other methods are desirable to address such environmental risks.

One method and system that addresses many of these problems is disclosed in U.S. Pat. No. 7,862,705 entitled "Methods of Recovering Hydrocarbons from Hydrocarbonaceous Material Using a Constructed Infrastructure and Associated Systems," which is incorporated herein in its entirety by reference. In that patent, a method of recovering hydrocarbons from hydrocarbonaceous materials is disclosed including forming a constructed permeability control infrastructure. This constructed infrastructure defines a substantially encapsulated volume. A mined hydrocarbonaceous material, such as oil shale, can be introduced into the control infrastructure to form a permeable body of hydrocarbonaceous material. The permeable body can be heated by an embedded conduit within the permeable body sufficient to reform and remove hydrocarbons therefrom leaving a lean shale or other earthen material. Removed hydrocarbons can be collected for further processing, use in the process as supplemental fuel or additives, and/or direct use without further treatment. The lean shale or other material may remain in the infrastructure. The control infrastructure can include fully lined impermeable walls or impermeable sidewalls with a substantially impermeable floor and cap.

In operation, temperature, pressure, and other variables can be controlled sufficient to produce a desired product. Accessing temperature and/or pressure sensors disposed within the control infrastructure can introduce challenges in that breaching the control infrastructure can lead to the undesirable release of hydrocarbon-containing gases, which can pose environmental concerns. For these and other reasons, it is desirable to prevent or minimize the release of hydrocarbon-containing gases from the control infrastructure during operation.

SUMMARY

An access system for a pressure controlled environment is disclosed, which can prevent or minimize the release of gases and vapor from a control infrastructure when accessing sensors disposed therein. The system can include a pressurized region having a first fluid therein, such as hydrocarbon-containing gases, water vapor, and mixtures thereof, and defined, at least partially, by a barrier, such as a wall of the control infrastructure, separating the pressurized region from a lower pressure region. The system can also include a trap fluidly coupling the pressurized region and the lower pressure region through at least a portion of the barrier, the trap having a second fluid therein, such as oil or water, forming a seal to prevent the first fluid from escaping the pressurized region. Additionally, the system can include at least one cable extending through the trap and the barrier into the pressurized region. The cable can function to communicate within the pressurized region. For example, the cable can couple a temperature or pressure sensor to a processor located outside the control infrastructure, which can be used to monitor and control temperature and/or pressure inside the control infrastructure. This system can be particularly suited to maintaining the first fluid within the pressurized region where large numbers of cables are routed through the barrier.

In one aspect, a method of accessing a pressure controlled environment is disclosed. The method can comprise fluidly coupling a trap to a pressurized region and a lower pressure region through at least a portion of a barrier separating the pressurized region from a lower pressure region, the pressurized region having a first fluid therein and being defined, at least partially, by the barrier. The method can also comprise forming a seal in the trap with a second fluid to prevent the first fluid from escaping the pressurized region. Additionally, the method can comprise accessing the pressurized region with a cable extending through the trap and the barrier.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

Features and advantages of the invention will be apparent from the detailed description that follows, and which taken in conjunction with the accompanying drawings, together illustrate features of the invention. It is understood that these drawings merely depict exemplary embodiments and are not, therefore, to be considered limiting of its scope. And furthermore, it will be readily appreciated that the components, as generally described and illustrated in the figures herein, could be arranged and designed in a wide variety of different configurations.

DETAILED DESCRIPTION

Figure 1:
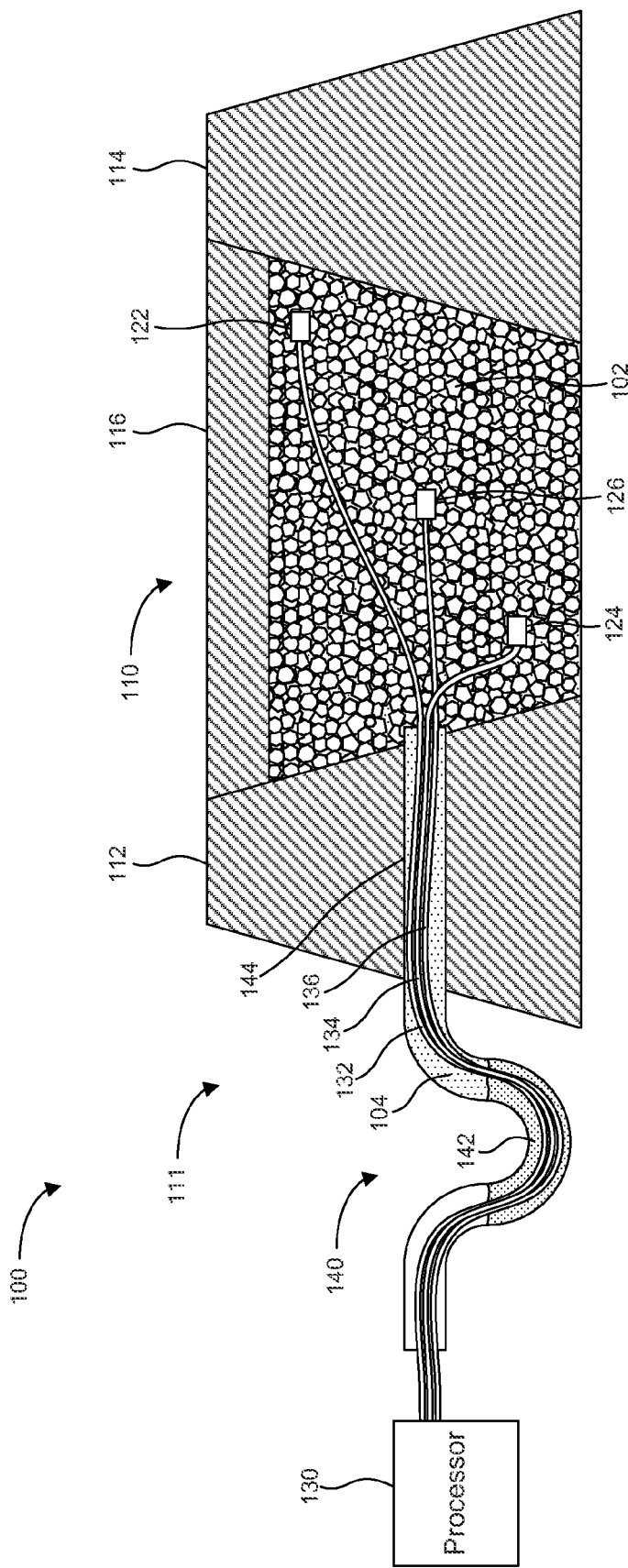
FIG. 1 is an access system for a pressure controlled environment, in accordance with an example of the present disclosure.

Reference will now be made to exemplary embodiments and specific language will be used herein to describe the same. It will nevertheless be understood that no limitation of the scope of the present invention is thereby intended. Alterations and further modifications of the inventive features described herein, and additional applications of the principles of the invention as described herein, which would occur to one skilled in the relevant art and having possession of this disclosure, are to be considered within the scope of the invention. Further, before particular embodiments are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

It must be noted that, as used in this specification and the appended claims, the singular forms "a," "an," and "the" include plural referents unless the context clearly dictates otherwise. Thus, for example, reference to "a cable" includes one or more of such features and reference to "a conduit section" includes reference to one or more of such conduit sections.

In describing and claiming the present invention, the following terminology will be used in accordance with the definitions set forth below.

As used herein, "conduit" refers to any passageway along a given distance. Although conduits can generally be circular pipes, other non-circular conduits can also be useful, e.g. oblong, rectangular, etc.

As used herein, "constructed infrastructure" refers to a structure which is substantially entirely man made, as opposed to freeze walls, sulfur walls, or other barriers which are formed by modification or filling pores of an existing geological formation. The constructed permeability control infrastructure is often substantially free of undisturbed geological formations, although the infrastructure can be formed adjacent or in direct contact with an undisturbed formation. Such a control infrastructure can be unattached or affixed to an undisturbed formation by mechanical means, chemical means or a combination of such means, e.g. bolted into the formation using anchors, ties, or other suitable hardware.

As used herein, "comminuted" refers to breaking a formation or larger mass into pieces. A comminuted mass can be rubbilized or otherwise broken into fragments.

As used herein, "hydrocarbonaceous material" refers to any hydrocarbon-containing material from which hydrocarbon products can be extracted or derived. For example, hydrocarbons may be extracted directly as a liquid, removed via solvent extraction, directly vaporized or otherwise removed from the material. However, many hydrocarbonaceous materials contain kerogen or bitumen which is converted to a hydrocarbon product through heating and pyrolysis. Hydrocarbonaceous materials can include, but is not limited to, oil shale, tar sands, coal, lignite, bitumen, peat, and other organic materials.

As used herein, "particle" refers to distinct solids. Typically, a particle can have a size from about ⅛ inch to about 6 feet, although sizes outside this range may be suitable. Additional guidance and more specific size ranges are set forth hereinafter.

As used herein, "mined" refers to a hydrocarbonaceous or other earthen material which has been removed or disturbed from an original stratigraphic or geological location to a second and different location or returned to the same location. Typically, mined material can be produced by rubbilizing, crushing, explosively detonating, drilling or otherwise removing material from a geologic formation.

As used herein, "impoundment" refers to a structure designed to hold or retain an accumulation of fluid and/or solid moveable materials. An impoundment generally derives at least a substantial portion of foundation and structural support from earthen materials. Thus, the control walls do not always have independent strength or structural integrity apart from the earthen material and/or formation against which they are formed.

As used herein, "permeable body" refers to any mass of comminuted hydrocarbonaceous material having a relatively high permeability which exceeds permeability of a solid undisturbed formation of the same composition.

As used herein, "wall" refers to any constructed feature having a permeability control contribution to confining material within an encapsulated volume defined at least in part by control walls. Walls can be oriented in any manner such as vertical, although ceilings, floors and other contours defining the encapsulated volume can also be "walls" as used herein.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and 200, but also to include individual sizes such as 2, 3, 4, and sub-ranges such as 10 to 50, 20 to 100, etc.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Any steps recited in any method or process claims may be executed in any order and are not limited to the order presented in the claims unless otherwise stated. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

With reference to FIG. 1, illustrated is an access system 100 for a pressure controlled environment. In one embodiment, the system 100 can include a pressure controlled environment or pressurized region 110 that can include a containment infrastructure having a barrier, such as walls 112, 114 and cap 116. In one aspect, the barrier can separate the pressurized region from a lower pressure region 111, such as a region outside the walls and cap relative to the pressurized region. The walls and cap can be impermeable to fluid by including bentonite amended soil (BAS), for example. Such a structure can be particularly suited for the extraction of hydrocarbons from hydrocarbonaceous materials 102, such as oil shale, tar sands, coal, etc., disposed within the pressurized region. The hydrocarbonaceous material can form a permeable body, having been comminuted, for example, to provide desirable permeability and void space. The hydrocarbon products can be extracted by passing a heat transfer fluid, such as hot air, hot exhaust gases, steam, hydrocarbon vapors and/or hot liquids, into or through conduits of a buried heat transfer system (not shown) to heat the hydrocarbonaceous material to temperature levels sufficient to remove hydrocarbons therefrom. In order for the extraction process to be effective, it can be desirable to raise the temperature of a permeable body of hydrocarbonaceous material to between 200° F. and 900° F. to initiate pyrolysis, depending on the particular hydrocarbonaceous material.

The system 100 can be applied at almost any scale. Larger encapsulated volumes and increased numbers of impoundments can readily produce hydrocarbon products and performance comparable to or exceeding smaller constructed infrastructures. As an illustration, single impoundments can range in size from tens of meters across to tens of acres. Optimal impoundment sizes may vary depending on the hydrocarbonaceous material and operating parameters, however typical current suitable areas can range from about one-half to twenty acres in top plan surface area. In one specific aspect, the top plan surface area can be about 10 to about 12 acres.

Non-limiting examples of mined hydrocarbonaceous material that can be treated comprise oil shale, tar sands, coal, lignite, bitumen, peat, or combinations thereof. In some cases it can be desirable to provide a single type of hydrocarbonaceous material so that the permeable body of hydrocarbonaceous material 102 consists essentially of one of the above materials. However, the permeable body can include mixtures of these materials such that grade, oil content, hydrogen content, permeability and the like can be adjusted to achieve a desired result. Further, different hydrocarbon materials can be placed in multiple layers or in a mixed fashion such as combining coal, oil shale, tar sands, biomass, and/or peat.

As a general guideline, the permeable body of hydrocarbonaceous material 102 can include particles from about ⅛ inch to about 6 feet, and in some cases less than 1 foot and in other cases less than about 6 inches. However, as a practical matter, sizes from about 2 inches to about 2 feet can provide good results with about 1 foot diameter being useful for oil shale especially. Void space can be an important factor in determining optimal particle diameters. As a general matter, any functional void space can be used; however, about 15% to about 60% and in some cases about 40% usually provides a good balance of permeability and effective use of available volumes. Void volumes can be varied somewhat by varying other parameters such as heating conduit placement, additives, and the like. Mechanical separation of mined hydrocarbonaceous materials allows creation of fine mesh, high permeability particles which enhance thermal dispersion rates once placed in capsule within the impoundment. The added permeability allows for more reasonable, low temperatures which also help to avoid higher temperatures which result in greater $CO_2$ production from carbonate decomposition and associated release of trace heavy metals, volatile organics, and other compounds which can create toxic effluent and/or undesirable materials which must be monitored and controlled.

Comminuted hydrocarbonaceous material 102 can be filled into the containment infrastructure to form the permeable body of hydrocarbonaceous material in any suitable manner. Typically the comminuted hydrocarbonaceous material can be conveyed into the control infrastructure by dumping, conveyors or other suitable approaches. As mentioned previously, the permeable body can have a suitably high void volume. Indiscriminate dumping can result in excessive compaction and reduction of void volumes. Thus, the permeable body can be formed by low compaction conveying of the hydrocarbonaceous material into the infrastructure. For example, retracting conveyors can be used to deliver the material near a top surface of the permeable body as it is formed. In this way, the hydrocarbonaceous material can retain a significant void volume between particles without substantial further crushing or compaction despite some small degree of compaction which often results from lithostatic pressure as the permeable body is formed.

Once a desired permeable body has been formed within the control infrastructure, heat can be introduced sufficient to begin removal of hydrocarbons, e.g. via pyrolysis. A suitable heat source can be thermally associated with the permeable body. Optimal operating temperatures within the permeable body can vary depending on the composition and desired products. However, as a general guideline, operating temperatures can range from about 200° F. to about 750° F. Temperature variations throughout the encapsulated volume can vary and may reach as high as 900° F. or more in some areas. In one embodiment, the operating temperature can be a relatively lower temperature to facilitate production of liquid product such as from about 200° F. to about 750° F. This heating step can be a roasting operation which results in beneficiation of the crushed ore of the permeable body. Temperature, pressure, and other variables can be controlled sufficient to produce predominantly, and in some cases substantially only, liquid product. Generally, products can include both liquid and gaseous products, while liquid products can require fewer processing steps such as scrubbers etc. The relatively high permeability of the permeable body allows for production of liquid hydrocarbon products and minimization of gaseous products, depending to some extent on the particular starting materials and operating conditions. In any event, a hydrocarbon-containing gas 104 is likely to be present and create a positive pressure within the pressurized region 110 of between about 0.1 psig to about 15 psig and, in a particular aspect, between about 0.5 psig and about 5 psig.

One or more sensors 122, 124, 126, such as a temperature sensor or a pressure sensor, can be buried inside the permeable body of hydrocarbonaceous material 102 to enable temperature and/or pressure data within the pressurized region 110 to be collected and monitored by a processor 130 located outside the pressurized region, such as in the lower pressure region 111. Such information can be used by the processor to adjust the heating and/or extraction processes in order to improve efficiency of the process and/or monitor progress of the recovery process. It is desirable from an environmental standpoint, however, to prevent or minimize the release of hydrocarbon-containing gases from the pressurized region when coupling the sensors and the processor.

To couple the sensors and the processor without allowing pressurized fluid or hydrocarbon gases 104 to escape the pressurized region 110, the system 100 can include a trap 140. The trap can fluidly couple the pressurized region and the lower pressure region 111 through at least a portion of a barrier, such as wall 112. In the figure, the trap is shown located outside the barrier or wall 112, opposite the pressurized region, such as in the lower pressure region. It should be recognized, however, that in some embodiments a trap can be located or disposed inside the pressurized region. The trap can include a fluid 142 that forms a seal to prevent the pressurized hydrocarbon gases from escaping the pressurized region.

In one aspect, the system 100 can include a conduit 144 fluidly coupled to the trap, which can extend through the barrier or wall 112. The conduit can provide a structural passageway through the wall and can prevent an earthen wall from collapsing on a passage formed through the wall. For example, the conduit can comprise a pipe, tube, channel, duct, or any other suitable structural passageway through the wall. In a specific aspect, where the conduit passes through the barrier or wall, the conduit can be formed of a single structural piece that contains no welds or junctions. This can enhance the structural integrity of the conduit under the loads experienced in the barrier or wall. Further, the barrier can be packed against the conduit surface so as to form an interface which prevents the hydrocarbon gases 104 from escaping along the interface between the barrier material and the conduit, which would tend to release the hydrocarbon gases from the pressurized region. For example, bentonite amended soil can be firmly packed around the conduit and kept hydrated so as to maintain a suitable seal for the pressurized region.

A cable, such as cables 132, 134, 136, can then extend through the trap 140 and the wall 112 into the pressurized region 110 to couple the sensors 122, 124, 126 and the processor 130, with the sensors being inside the pressurized region and the processor being outside the pressurized region, such as in the lower pressure region 111. Using a fluid as a seal in the trap is beneficial in that a fluid can flow around the cables and fill in gaps between the cables and maintain a seal where the cables pass through the trap and cross a pressure boundary into the pressurized region. Thus, the trap can allow access to the pressurized region for the cables from a location outside the pressurized region, while preventing gas from escaping the pressurized region. In addition, the fluid can provide a seal that can be penetrated by a cable and can automatically reseal about the penetrating cable without need of repair or other action by a user. This attribute can facilitate disposing the trap in a location that is not readily accessible or even inaccessible by a user, such as inside the barrier or pressurized region.

It should be recognized that the cables 132, 134, 136 can comprise any suitable type of cable that can be utilized to carry data or otherwise communicate with the pressurized region 110, including, but not limited to, an electrical wire, an optical fiber, hollow tube, mechanical actuator sleeved wire, hydraulic actuator, actuator cable, or the like. For example, a hollow tube can be used to measure pressure within the pressurized region. Alternatively, a hollow tube can be used to retrieve samples from the pressurized region during operation. It should be further recognized that any number of cables can be used, being limited only by practical considerations, such as the application, the size of the trap 140, or the number of sensors 122, 124, 126. The system 100 can be particularly suited to maintaining the fluid or hydrocarbon gases 104 within the pressurized region where large numbers of cables are routed through the barrier. Specifically, when more than two cables are bundled, a gap typically forms between adjacent cables which can be difficult to seal using conventional approaches such as polymers, caulking or the like, but that can be readily sealed by the fluid 142 in the trap. In many embodiments, a large number of cables can be bundled together to form one or more bundles of cables. For example, in one aspect, one or more bundles of cables can be used, with each bundle comprising multiple cables such that dozens or hundreds of cables can be routed through the access system. Thus, in one aspect, the system can include at least three cables routed through the trap.

During the heating process, the permeable body of hydrocarbonaceous material 102 can undergo significant vertical subsidence movement and settling as the hydrocarbons are released. Thus, subsidence of the hydrocarbon lean materials within the infrastructure over time can cause stress on the cable 132 and attached sensor 122 that can lead to failure of the cable and/or the sensor coupling to the cable. Such failures can have a detrimental effect on the ability to control the temperature and/or pressure inside the control infrastructure. To prevent such failures from occurring, extra length of cable can be included to provide "slack" in the cable as it extends between the processor 130 and the sensor. This can allow the cable to move along with the permeable body of hydrocarbonaceous material as it undergoes subsidence movement and settling, which can protect the cable and sensor coupling from structural failure. In one aspect, the cable can be coiled or gathered inside the conduit 144 to provide an available extra length of cable. It should be recognized that an extra length cable can be disposed inside the permeable body of hydrocarbonaceous material, inside the trap 140, outside the trap and control infrastructure, or any other suitable location along the cable path between the processor and the sensor.

In one aspect, multiple traps can be utilized to provide access to the pressurized region 110. This can be beneficial, for example, in an application that would normally require one relatively large trap to accommodate the size and/or number of cables involved. In this case, the relatively large trap can be substituted with multiple smaller traps. In a specific aspect, multiple traps can be utilized to reduce the length of cable extending through the permeable body of hydrocarbonaceous material 102. For example, as shown in FIG. 1, cable 132 extends across the majority of the pressurized region 110 to reach the sensor 122. By using multiple traps, for example, a second trap can be located near the wall 114 and can be fluidly coupled to the pressurized region through at least a portion of the wall 114, similar to the relationship of trap 140 to wall 112. The cable extending through the second trap can be coupled to the processor 130 or to another processor. With this additional trap, the length of cable disposed in the hydrocarbonaceous material to reach sensor 122 can be minimized or reduced. A reduced or minimized length of cable in this regard can reduce the likelihood of damage for cable subjected to the often harsh environment in the pressurized region. This can also reduce the likelihood of damage to cable that is subjected to the subsidence forces of the hydrocarbonaceous material 102.

Figure 2A:
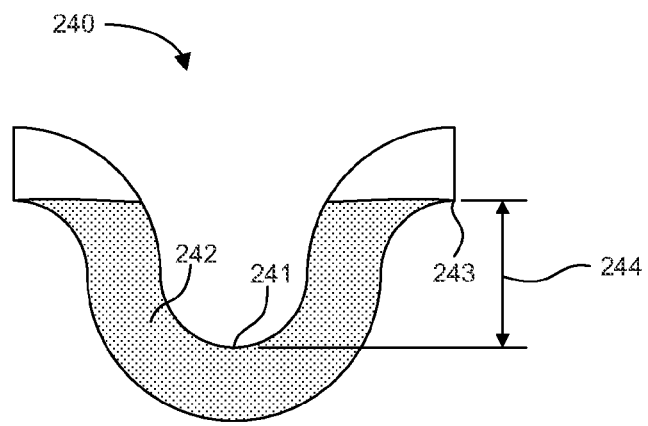
FIG. 2A is trap having a sealing fluid disposed therein at a maximum seal depth, in accordance with an example of the present disclosure.
Figure 2B:
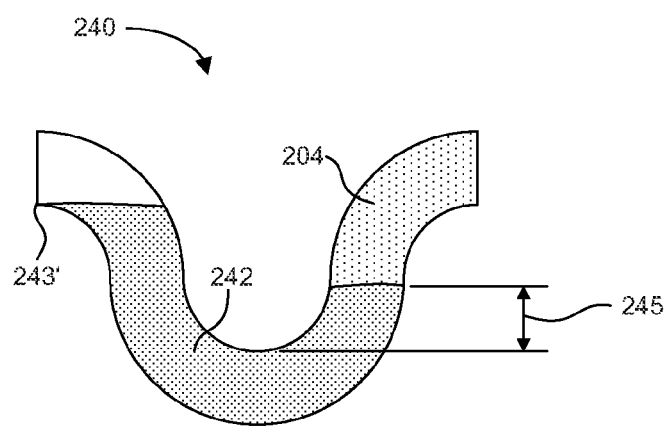
FIG. 2B is the trap of FIG. 2A with the sealing fluid at a reduced seal depth due to displacement by a pressurized fluid.
Figure 2C:
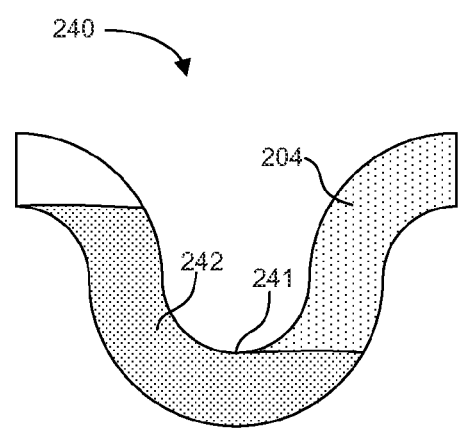
FIG. 2C is the trap of FIG. 2A with the sealing fluid displaced by the pressurized fluid sufficient to eliminate the seal depth.

Illustrated in FIGS. 2A-2C is a trap 240 in accordance with an embodiment of the present disclosure. For simplicity and clarity, many components and elements of the present disclosure are omitted from these figures. As shown, the trap 240 can comprise a U-shape configuration. In this manner, the lowest point of the upper conduit wall is below the fluid level so that the conduit is blocked by fluid in the trap region. The effect of gravity can cause the U-shaped portion of the trap to hold or retain a sealing fluid 242, which can allow the fluid 242 to form a seal in the trap that prevents the fluid or hydrocarbon gases 204 from escaping the pressurized region. In other words, the fluid 242 in the trap can block the fluid 204 (shown in FIGS. 2B and 2C) from passing through the trap and out of the pressurized region into the surrounding atmosphere or environment. It should be recognized that the trap can comprise any suitable configuration or shape that can hold or retain the sealing fluid and allows the fluid to form a seal in the trap to prevent the pressurized fluid from passing through the trap. For example, the trap can comprise a P-shape configuration, a J-shape configuration, an S-shape configuration, or any variation or modification of a U, P, J, or S shape configuration.

In one aspect, the trap 240 can have a constant cross-sectional area along its length (i.e., tubular) or a variable cross-sectional area along its length. In addition, the trap can be configured to allow cables, such as those illustrated in FIG. 1, to pass through unobstructed and without binding. To this end, the trap can comprise a single structure that is devoid of any partitions or seams that can obstruct the cables. In one aspect, a bend in a trap and/or conduit, such as at a junction between a trap and a conduit, can be configured with a radius suitable to facilitate passage of a cable without excessive bending or kinking of the cable that may inhibit passing or sliding the cable therethrough, or that may result in damage to the cable. In another aspect, a U-shape configuration of a trap can be "flattened," such as by configuring the U-shape without vertical sides, to facilitate passage of a cable through the trap.

In one aspect, the sealing fluid 242 can have a greater density than the pressurized fluid 204. This can allow the sealing fluid to reside in the lower U-shaped portion of the trap below the pressurized fluid. For example, in a particular aspect, the sealing fluid can be in a liquid state. In another particular aspect, the pressurized fluid can be in a gaseous state. The sealing fluid can be any suitable fluid, such as oil, liquid water, a liquid polymer, etc. Suitable oils can include, but are not limited to, light oils (e.g. heating oil, jet fuel, gasoline, diesel, or any other type of fuel oil), water, and the like. Heavier oils (e.g. crank case oil, transmission oil, or any other type of lubricating oil) may also be suitable as long as the sealing fluid is sufficiently fluid to create a barrier to passage of gases and vapor around the cables. In one embodiment, the sealing fluid can comprise a heating oil.

With further reference to FIG. 2A, the sealing fluid 242 is disposed in the trap in an amount that equals a maximum trap seal depth 244. The maximum trap seal depth is measured from the trap dip 241 at a bottom end of the trap, to the trap crown 243 at a top end of the trap, assuming that the trap crown is at a high point of the local fluid path. However, as illustrated in FIG. 2B, due to the positive pressure present in the pressurized region, the pressurized fluid 204 may displace the sealing fluid in the trap (although exaggerated for purposes of illustration). In this case, the sealing fluid 242 can escape the trap by flowing over the trap crown 243'. As a result, the seal depth 245 is lower than the maximum trap seal depth 244 illustrated in FIG. 2A. As shown in FIG. 2C, as the pressure in the pressurized region increases, the pressurized fluid 204 can further displace the sealing fluid 242 until the sealing fluid reaches the trap dip 241, at which point, the pressurized fluid 204 can escape the trap, there being no effective resistance or seal formed by the fluid 242 in the trap. Furthermore, the seal depth can also be reduced by evaporation of the sealing fluid 242. It is desirable, therefore, to maintain an adequate seal depth of sealing fluid 242 in the trap to maintain the seal and prevent the pressurized fluid 204 from escaping.

Figure 3:
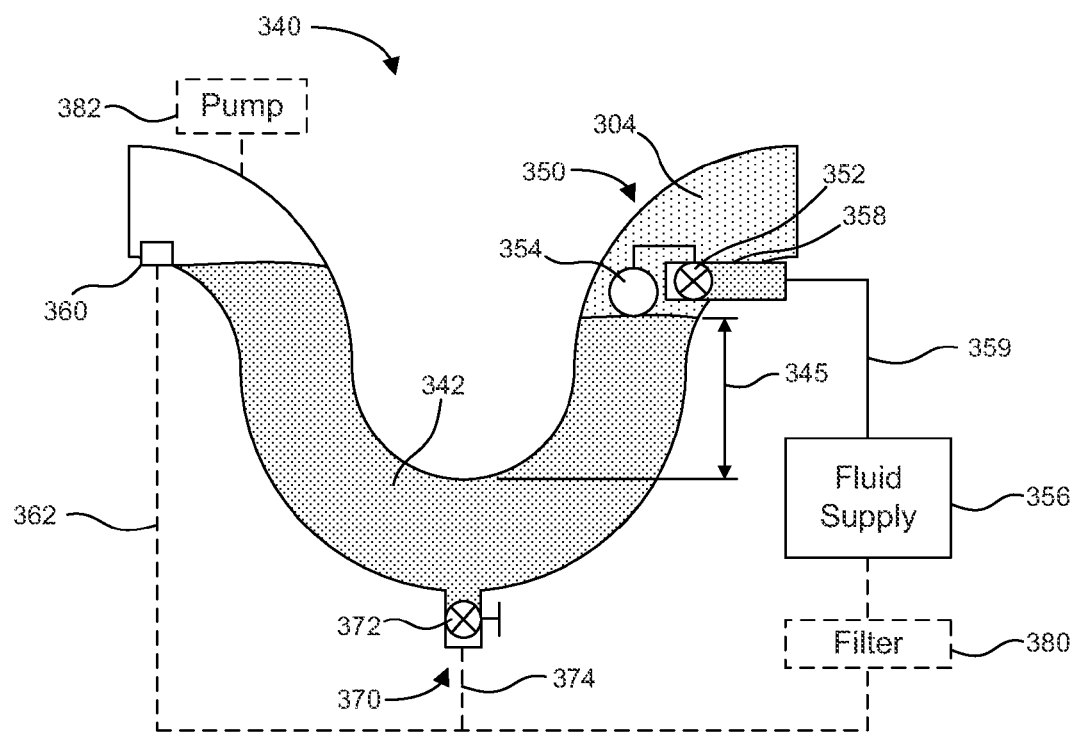
FIG. 3 is a trap and associated features configured maintain an adequate seal depth, in accordance with an example of the present disclosure.

As illustrated in FIG. 3, therefore, certain features can be associated with a trap 340 to maintain an adequate seal depth 345 of a sealing fluid 342. For example, a trap primer 350 can be included to maintain a predetermined amount of the sealing fluid in the trap in order to maintain the seal. As mentioned above, the seal depth can be diminished due to pressurized fluid 304 pushing the sealing fluid out of the trap and/or by evaporation of the sealing fluid. In one aspect, the trap primer can automatically recharge the trap with sealing fluid to maintain an adequate seal depth and, therefore, the seal. For example, the trap primer can include a port 358 coupled to a fluid supply 356 of sealing fluid by a fluid coupling 359. The fluid supply can supply new and/or recycled sealing fluid, as described hereinafter. A valve 352 can control the flow of sealing fluid through the port. The valve 352 can comprise a ball valve, a gate valve, a pinch valve, a diaphragm valve, a needle valve, or any other suitable valve. In one aspect, the valve can be electronically actuated and/or controlled, which can facilitate automated computer control of the valve. The valve can be configured to open and/or close as controlled by a float 354, which can be accomplished by a mechanical, electronic, or electromechanical control device or mechanism. The float can be configured to float on the sealing fluid and can open the valve to introduce sealing fluid into the trap when the seal depth deviates below the predetermined adequate sealing depth 345. When the float rises on the sealing fluid to the predetermined adequate sealing depth, the float can be configured to close the valve, which cuts off the supply of sealing fluid to the trap from the sealing fluid supply. The trap primer can therefore account for sealing fluid loss as a result of displacement by the pressurized fluid and/or evaporation in order to maintain the seal indefinitely. In one aspect, the valve 352 can be controlled or operated from outside the trap, for example, to perform an initial fill of the trap with sealing fluid or to allow for manual control of the seal depth.

It may be desirable to avoid an overflow of sealing fluid 342 from the trap 340 due to displacement by the pressurized fluid 304. Thus, in one aspect, a drain 360 can be included in the trap to allow the sealing fluid to drain from the trap prior to overflowing. For example, the drain can be located near a crown of the trap to allow the sealing fluid to utilize most of the vertical distance available in the trap in order to offset at least some of the force provided by the pressurized fluid before being drained from the trap. In a specific aspect, the drain can be coupled to the fluid supply 356 by a fluid coupling 362. In this way, the sealing fluid that is drained from the trap can be reused and reintroduced into the trap by the trap primer 350.

Additionally, it may be desirable to remove some or all of the sealing fluid 342 from the trap 340. Accordingly, a drain 370 can be included in the trap to evacuate the sealing fluid from the trap. The drain can include a valve 372 that can be operated from outside the trap. The valve 352, 372 can comprise a ball valve, a gate valve, a pinch valve, a diaphragm valve, a needle valve, or any other suitable valve. In one aspect, the valve can be electronically actuated and/or controlled, which can facilitate automated control of the valve. The drain and valve can be configured to remove solid or liquid elements that may interfere with proper operation of the trap. As with the drain 360 discussed above, the drain 370 can be coupled to the fluid supply 356 by a fluid coupling 374. In this way, the sealing fluid that is drained from the trap can be reused and reintroduced into the trap by the trap primer 350. A filter 380 can also be used to remove impurities from the sealing fluid prior to introduction of the sealing fluid into the fluid supply.

In one aspect, the effect of the pressurized fluid 304 in displacing the sealing fluid 342 in the trap 340 can be mitigated. For example, a back pressure can be applied by a pump 382 from an outside end of the trap to prevent sealing fluid 342 from being pushed out of the trap region. This can be accomplished by maintaining trap outlet pressure higher than the trap inlet pressure minus the pressure head of the sealing fluid. This can reduce the displacement of the sealing fluid such that the adequate sealing depth 345 can be maintained.

Figure 4A:
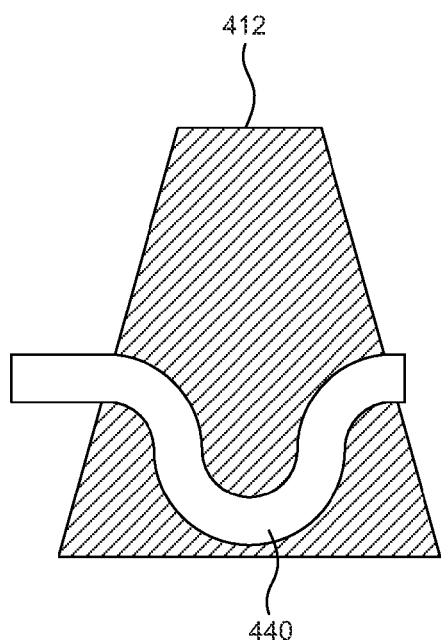
FIG. 4A is a trap disposed within a barrier, in accordance with an example of the present disclosure.
Figure 4B:
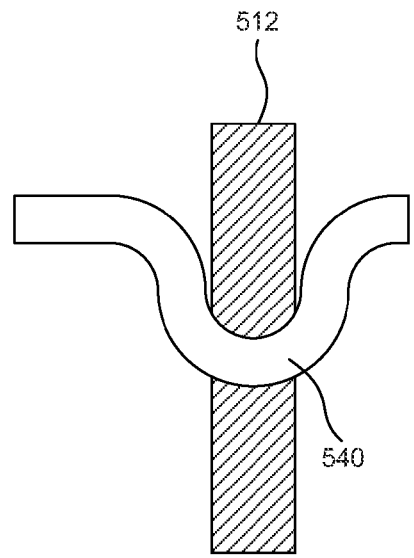
FIG. 4B is a trap disposed partially within a barrier, in accordance with an example of the present disclosure.

With reference to FIGS. 4A and 4B, example embodiments are shown illustrating a relationship between a trap and a barrier of a pressurized region. For example, FIG. 4A illustrates a trap 440 disposed within a barrier 412. In this example, the U-shaped portion of the trap is disposed entirely within the barrier. FIG. 4B illustrates a trap 540 partially disposed within a barrier 512. In this example, the U-shaped portion of the trap is disposed only partially within the barrier, as the vertical sides of the U-shaped portion are outside the barrier. With these example embodiments, including the embodiment in FIG. 1, it should be recognized that a trap can maintain any suitable relationship relative to a pressurized region barrier.

Figure 5:
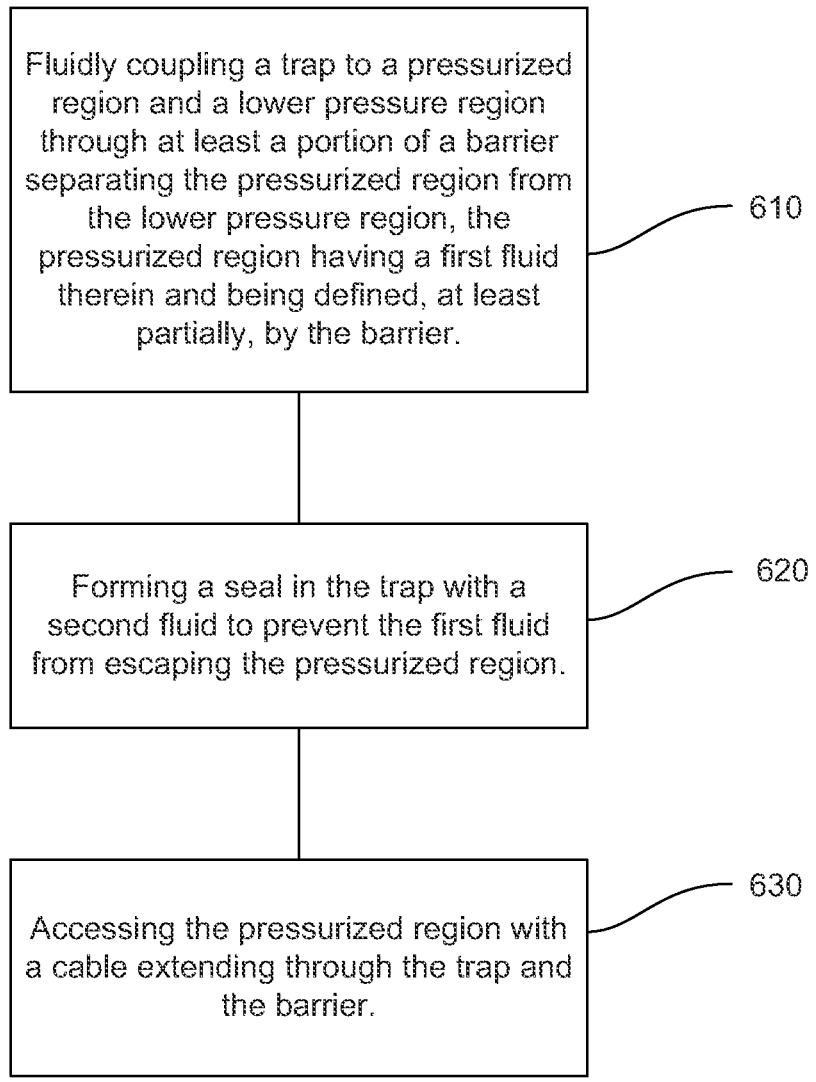
FIG. 5 is a block diagram illustrating a method of accessing a pressure controlled environment, in accordance with an example of the present disclosure.

With reference to FIG. 5, a block diagram illustrates a method of accessing a pressure controlled environment. The method can comprise fluidly coupling a trap to a pressurized region and a lower pressure region through at least a portion of a barrier separating the pressurized region from the lower pressure region, the pressurized region having a first fluid therein and being defined, at least partially, by the barrier 610. The method can also comprise forming a seal in the trap with a second fluid to prevent the first fluid from escaping the pressurized region 620. Additionally, the method can comprise accessing the pressurized region with a cable extending through the trap and the barrier 630. It is noted that no specific order is required in this method, though generally in one embodiment, these method steps can be carried out sequentially.

In one aspect, the method can further comprise fluidly coupling a conduit to the trap that extends through the barrier. In another aspect, the method can further comprise collecting data from the pressurized region. Collection can be in the form of data retrieved from a sensor coupled to the cable, pressure sensed through a hollow cable or via retrieval of material samples from the pressurized region. In yet another aspect of the method, collecting data can comprise measuring at least one of a temperature inside the pressurized region and a pressure inside the pressurized region.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. Any steps recited in any method or process claims may be executed in any order and are not limited to the order presented in the claims. Accordingly, the scope of the invention should be determined solely by the appended claims and their legal equivalents, rather than by the descriptions and examples given above.

What is claimed is:

1. An access system for a pressure controlled environment, comprising:
   a pressurized region having a first fluid therein and defined, at least partially, by a barrier separating the pressurized region from a lower pressure region;
   a trap fluidly coupling the pressurized region and the lower pressure region through at least a portion of the barrier, the trap having a second fluid therein forming a seal to prevent the first fluid from escaping the pressurized region; and
   at least one cable extending through the trap and the barrier into the pressurized region.

2. The access system of claim 1, wherein the trap comprises a U-shape configuration.

3. The access system of claim 1, wherein the second fluid is in a liquid state.

4. The access system of claim 1, wherein the second fluid comprises at least one of a light oil and water.

5. The access system of claim 1, wherein the first fluid comprises a hydrocarbon-containing gas.

6. The access system of claim 1, further comprising a trap primer to maintain a predetermined amount of the second fluid in the trap to maintain the seal.

7. The access system of claim 1, further comprising a drain in the trap to evacuate the second fluid from the trap.

8. The access system of claim 1, further comprising a drain to allow the second fluid to drain from the trap prior to overflowing from the trap.

9. The access system of claim 1, wherein the trap is located in the lower pressure region outside the barrier.

10. The access system of claim 1, wherein the trap is disposed, at least partially, within the barrier.

11. The access system of claim 1, further comprising a conduit fluidly coupled to the trap and extending through the barrier.

12. The access system of claim 1, wherein the cable comprises at least one of a wire and an optical fiber.

13. The access system of claim 1, wherein the cable comprises a plurality of cables.

14. The access system of claim 1, further comprising a processor coupled to the cable outside the pressurized region.

15. The access system of claim 1, further comprising a sensor coupled to the cable inside the pressurized region.

16. The access system of claim 15, wherein the sensor comprises at least one of a temperature sensor and a pressure sensor.

17. The access system of claim 1, wherein the pressurized region is at a pressure of between about 0.5 psig and about 5 psig.

18. The access system of claim 1, wherein the pressurized region is at a temperature of between about between 200 degrees F. and about 900 degrees F.

19. The access system of claim 1, wherein a hydrocarbonaceous material is disposed within the pressurized region.

20. The access system of claim 1, wherein the barrier comprises bentonite amended soil (BAS).

21. A method of accessing a pressure controlled environment, comprising:
   fluidly coupling a trap to a pressurized region and a lower pressure region through at least a portion of a barrier separating the pressurized region from the lower pressure region, the pressurized region having a first fluid therein and being defined, at least partially, by the barrier;
   forming a seal in the trap with a second fluid to prevent the first fluid from escaping the pressurized region; and
   accessing the pressurized region with a cable extending through the trap and the barrier.

22. The method of claim 21, further comprising fluidly coupling a conduit to the trap that extends through the barrier.

23. The method of claim 21, further comprising collecting data from the pressurized region via the cable.

24. The method of claim 21, wherein collecting data comprises measuring at least one of a temperature inside the pressurized region and a pressure inside the pressurized region.

* * * * *